US006952767B1

(12) United States Patent
Tanaka

(10) Patent No.: US 6,952,767 B1
(45) Date of Patent: Oct. 4, 2005

(54) SYSTEM AND METHOD FOR MAINTAINING A PREDETERMINED PRICE/PERFORMANCE LEVEL OF TECHNOLOGY ON A COMPUTER SYSTEM DURING A SUBSCRIPTION

(75) Inventor: Motoo Tanaka, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 09/983,908

(22) Filed: Oct. 26, 2001

(51) Int. Cl.[7] ............................................. G06F 1/24

(52) U.S. Cl. ......................... 713/100; 700/97; 705/1; 717/171

(58) Field of Search .................... 713/100; 717/171; 700/97; 705/1

(56) References Cited

U.S. PATENT DOCUMENTS

| | | | |
|---|---|---|---|
| 5,960,189 A * | 9/1999 | Stupek, Jr. et al. ......... | 717/169 |
| 6,192,470 B1 * | 2/2001 | Kelley et al. .................. | 713/1 |
| 6,542,943 B2 * | 4/2003 | Cheng et al. ................. | 710/36 |
| 6,711,676 B1 * | 3/2004 | Zomaya et al. ............. | 713/100 |
| 6,711,738 B1 * | 3/2004 | Kuth et al. .................. | 717/173 |

OTHER PUBLICATIONS

IBM Technical Disclosure Bulletin, "Computer systems that determines hardware required and allows ordering", vol. 37, Issue 10, pp. 679-680, Oct. 1994.*
Applied Radiology Online, "VIDAR introduces obsolescence protection program", Jan. 8, 2001.*

* cited by examiner

Primary Examiner—Thomas Lee
Assistant Examiner—Albert Wang

(57) ABSTRACT

A system and method for maintaining a computer system at a predetermined cost/performance level by automatically selecting hardware and software upgrades for a given, desired level of technology and cost. A subscriber to the inventive system either has an existing computer system or selects a standard computer configuration from an available list provided through the system. The subscriber also selects a desired class of computer technology that is a function of the cost and performance level of the hardware and software components that are available to configure the computer system. Information related to any changes in technology performance and cost for computer system components is input to the system. This information is assessed by the system, and periodically various components of the subscriber's computer system are upgraded to maximize the performance of the computer system while keeping it within the cost/performance ratio of the class or level of technology selected by the subscriber. For this service, the subscriber pays a subscription fee.

20 Claims, 4 Drawing Sheets

SYSTEM AND METHOD FOR MAINTAINING A PREDETERMINED PRICE/PERFORMANCE LEVEL OF TECHNOLOGY ON A COMPUTER SYSTEM DURING A SUBSCRIPTION

BACKGROUND OF THE INVENTION

1. Field of the Invention

The present invention relates generally to determining upgrades to computer hardware and software, and more particularly, to maintaining a user-selected level of technology within a computer system through automated selection of hardware and software upgrades.

2. Background Information

A large number of personal computers are used by individuals having little or no training regarding diagnosing hardware or software problems. These typical users also lack knowledge regarding the performance levels of the equipment and software in their computer. For example, a typical user often can not determine if the equipment and software are performing at optimum levels. Many users are unable or unwilling to determine how and to what extent their equipment and software should be upgraded to support additional computer applications or to improve performance. These users are often limited to going to a nearby computer store and trying to explain their computer applications and needs to the sales clerks.

Compounding this situation has been the increasing rate of change within the personal computer market, with upgrades in equipment and software being introduced with ever increasing frequency. This adds an ever increasing number of options from which the personal computer user can choose. Often the upgraded equipment and software offer increased computing power, options, and resources at less money than the personal computer user spent to configure their respective computer system. For example, a user may have configured their computer system with a 10 gigabyte hard drive for an additional $200.00. Six months later, a personal computer system is available with a 50 gigabyte hard drive available at no additional price.

Those users who upgrade their hardware and software are often left with extraneous hardware and software for which they no longer have any use. In the above hard drive example, assume a user can replace the 10 gigabyte hard drive in their computer with a 50 gigabyte hard drive for $100. For a cost of $100, the user has increased the hard drive space four-fold, but has a disconnected 10 gigabyte hard drive for which there is no available port or computer on which to use the drive. If any market exists for such a left-over device, the user will likely receive only pennies on the dollar for a perfectly functional piece of equipment. The same is true when a user purchases an upgraded software package, particularly, when the user must purchase a completely new version of the software instead of buying a relatively inexpensive upgrade to the software.

Accordingly, it would be desirable to provide a system and method for automatically determining available computer hardware and software upgrades to maintain a user-selected level of technical competence and power within a computer system, within a set budget amount, and without the burden of reselling hardware and software which has been replaced.

SUMMARY OF THE INVENTION

The present invention is directed to a system and method for maintaining a computer system at a predetermined cost/performance level by automatically selecting hardware and software upgrades for a given, desired level of technology and cost. A subscriber to the inventive system either has an existing computer system or selects a standard computer configuration from an available list provided through the system. The subscriber also selects a desired class of computer technology that is a function of the cost and performance level of the hardware and software components that are available to configure the computer system. Information related to any changes in technology performance and cost for computer system components is input to the system. This information is assessed by the system, and periodically various components of the subscriber's computer system are upgraded to maximize the performance of the computer system while keeping it within the cost/performance ratio of the class or level of technology selected by the subscriber. For this service, the subscriber pays a subscription fee.

Exemplary embodiments of the present invention are directed toward a method and apparatus for updating at least one of the hardware and software of a computer system to maintain the computer system at a predetermined one of plural cost/performance levels, including the steps of receiving a subscription to maintain a user's existing computer system within a predetermined one of plural cost/performance levels; assessing changes to the performance and cost of hardware and software suitable for a given cost/performance level at which the computer system is to be maintained; and automatically selecting upgrades to reconfigure the computer system when the changes satisfy a cost/performance ratio associated with the given cost/performance level.

In exemplary embodiments, the computer system is maintained by implementing the automatically selected upgrades on the computer system upon advance receipt of the subscription by the interface. The step of implementing the automatically selected upgrades is fulfilled by transmitting software upgrades across a network to the computer system and by shipping hardware upgrades to the computer system location. The step of reconfiguring the computer system with the automatically selected upgrades maintains the predetermined cost/performance level on the computer system, wherein the predetermined cost/performance level is determined from one of a plurality of classes of cost and from one of a plurality of classes of technology.

BRIEF DESCRIPTION OF THE DRAWINGS

These and other objects and advantages of the present invention will become more apparent and more readily appreciated to those skilled in the art upon reading the following detailed description of the preferred embodiments, taken in conjunction with the accompanying drawings, wherein like reference numerals have been used to designate like elements, and wherein.

DETAILED DESCRIPTION OF THE PREFERRED EMBODIMENTS

Figure 1:
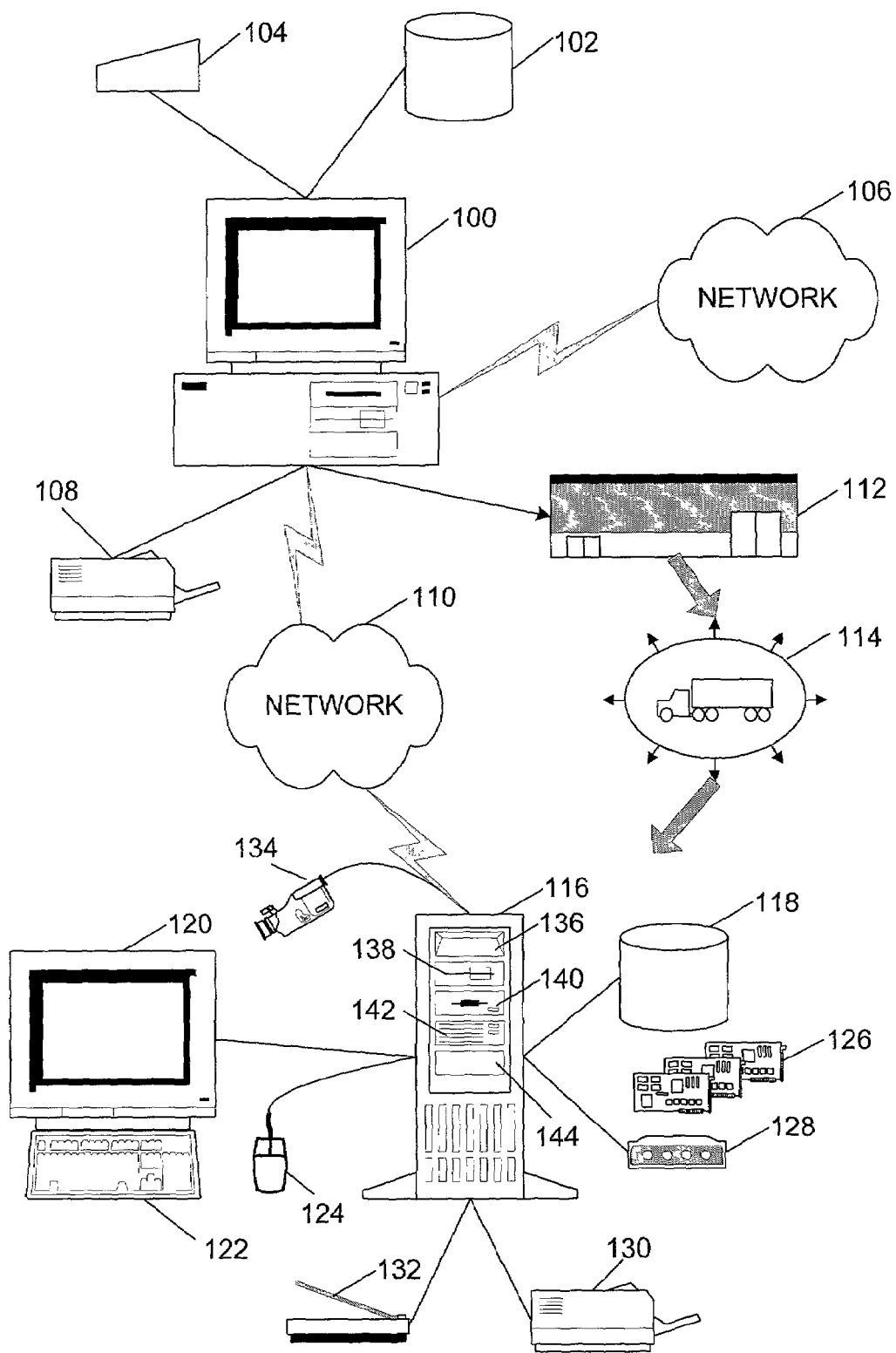
FIG. 1 shows a block diagram of the components of an exemplary system for maintaining a predetermined level of technology on a computer system.

Referring now to FIG. 1, there is shown a block diagram of the components of an exemplary embodiment of the invention for maintaining a predetermined level of technology on a computer system. The FIG. 1 system is implemented on a computer 100, wherein the computer and its processor can be any type of known computer, including a personal computer, a server, or a mainframe computer. The computer 100 is connected across a network 106 to a plurality of information sources that have knowledge regarding hardware and software components that can be used to configure and reconfigure a computer 116 for maintaining a predetermined level of technology on the computer system 116. The computer system 116 can include a desktop personal computer, a laptop personal computer, a personal digital assistant, a server computer, or a mainframe computer. For purposes of explanation and not limitation, the following description will disclose how the invention maintains a predetermined level of technology on a desktop personal computer system.

The network 106 can be the Internet, or any form of communications medium, including an intranet, an extranet, a private network, any public network, and/or a local area network. In addition, and consistent with the flexible nature of the present invention, access to the network 106 by the computer 100 can be through a wireless means or can be enabled through a wired connection, such as a telephone line, a coaxial connection, or any known hard-wired access. Similarly, any known communication protocol can be used for the computer 100 to communicate across the network 106. The network access is designed to provide two-way communication with the computer 100 by providing the downloading of information to the computer 100 for storage on the storage device 102 and for the transmission of queries by the computer 100 to remote sources of information to access pricing and performance information related to computer hardware and software products.

The inventive system is configured to receive information related to computer hardware and software components through the network 106 and/or through manual input means represented by the input unit 104, which can include input entered manually through a keyboard, a scanner, or any known input device attached to the computer 100. This product information is stored in a product database on the storage device 102 and particularly includes cost information regarding the various hardware and software components that can be added to a personal computer 116. For example, this data can indicate that a particular model of CPU now available from a given manufacturer costs $745.50, or that a mouse marketed by a particular vendor costs $29.95. This information also includes technological specification information regarding computer components, such as processor speed, hard drive storage capacity, monitor size, modem speed, printer speed, printer connection compatibility, software version number, and software hard drive storage requirements. The computer component information can be downloaded to the computer 100 periodically, such as at the first of every month and/or can be sent as new or changed information becomes available, such as upon the release of a new version of operating system software used by the computer. The flow of information across the network 100 for storage on the storage device 102 can therefore be automatic so the various files and databases on the storage device 102 are maintained as current with little or no interaction by any user of the computer 100.

The component information can be organized in one or more hierarchical databases on the storage device 102 so that information regarding a particular product is easily accessed. While FIG. 1 shows the storage device 102 as a single device, the files and databases utilized by the invention can reside on multiple storage devices without detracting from the functionality of the invention, as discussed more thoroughly below regarding FIG. 4. Additionally, the user of the computer 100 can submit queries across the network 100 to any number of computer systems, web sites, and information files to solicit desired cost and technological information. For example, the user may wish to establish a new, storage-oriented personal computer configuration and, therefore, correspondingly searches across the network 100 for information related to how many and what kind of storage devices can be installed in or attached to various personal computers 116.

Once a minimal amount of cost and technological specification information is stored on the storage device 102, the inventive system can begin configuring personal computer systems. This process can begin with the establishment of a plurality of technology classes, which can also be referred as levels of technology. The present invention recognizes that different personal computer users have different needs and wants. For example, one user who desires a computer system primarily for word processing will need a computer hardware and software setup that is different from the computer system configuration for a user who is primarily interested in accessing the Internet for information and entertainment. The invention supports a plurality of levels of technology from which a customer can select, including word processing, spreadsheet, programming, business, education, scientific, mathematics, research, graphics, music, animation, and communications.

A user whose interests and needs for a personal computer 116 fall into the word processing class of technology would be someone whose primary use of the personal computer 116 is for drafting papers, memos, reports, and even novels. Such a user could also rely on the computer system 116 for desktop publishing. A personal computer system configuration for such a user would ensure adequate hard drive storage for all produced writings and at least one durable output device for quality printing, as opposed to configuring a system with a fast processor. Additionally, the invention configures multiple computer systems 116 for each level of technology to accommodate customers who have or want different computer system types, such as computer system configurations directed toward desktop personal computers, laptop personal computers, personal digital assistants, and server computers.

Not all writers are equally situated financially, nor do all writers have the same financial resources or needs. Therefore, within the technology class of word processing are several cost, or grade, classes by which subscription fees are established for varying qualities and performance capacities of word processing hardware and software. For example, the present inventive system can configure a personal computer system for a basic word processing application for an exemplary subscription fee of $50.00 per month which includes a computer 116 having a processor 144, a diskette drive 140, and an internal hard drive 142; a 15" monitor 120, a keyboard 122, a mouse 124, and a color printer 130. It is important to note that the dollar values presented within the present disclosure are exemplary only and are not intended to represent the actual or relative pricing of either the hardware and software components or the subscription fees charged to a user of the inventive system. At a higher cost class, with an exemplary monthly subscription fee of $75.00 per month, the present system can configure an advanced system including all the components of the basic word processing configuration discussed above but also including a scanner 132, a 17" monitor 120, and a graphics card 126. A professional grade cost class system can, for example, include additional desktop publishing software and a laser printer. By selecting a particular class of technology and a cost class within the technology class, the user has effectively selected a cost/performance ratio that is intended to satisfy his or her computer processing and output needs within a desired budget.

The business class of technology is intended to provide a general purpose personal computer to support the diverse computing needs of a business professional person. The computer system configuration satisfying this level of technology would include a processor of average speed; a reasonable amount of hard drive 142 storage to store records, research results, correspondence, and reports; a monitor 120 large enough to be easy to use for long periods of time; a quality printer 130 that can handle large volumes of print; and a plurality of word processing, research, communications, and analysis software. For those business users who anticipate a need to communicate with other personal computer users in the course of business, the system provides for a higher cost class within the business technology class that includes an ethernet card 126 or a DSL connection for improved communications.

Any number of subscription cost, or grade, classes can be provided within the business technology class level (or any of the technology class levels, for that matter) to provide flexibility for the wide variety of business users and applications. Additionally, a user can select a combination class of technology. For example, a sole proprietor may be interested in the personal computer configuration available through the business class but may realize also that he or she has significant word processing means. This user can select what is then a business/word processing technology class. Although no such class actually exists within the present inventive system, embodiments of the system can be provided with the decision capability to combine classes within a subscription class to create a combined hardware and software configuration satisfying the requirements of both classes. The system selects from the configuration of both classes, ensuring the resultant configuration is complete for both classes and includes the better component from the two classes when the classes include the same component category. For example, the word processing technology class would not typically include analysis software, whereas the business technology class does call for including analysis software in the final configuration. Therefore, the configuration for a word processing/business combination class would include analysis software. If the word processing configuration for the selected subscription class provides for a 15" monitor 120 and the business configuration calls for a 17" monitor 120, the word processing/business combination would provide for a 17" monitor 120.

One problem recognized by the present system in providing for such combinations (combinations of any number of technology classes are possible), is that the resultant configuration may not be able to be offered for the same subscription fee as charged for the word processing configuration and as charged for the business class configuration. One reason for this difference is that the combination configuration can include more components than either of the word processing or the business configurations because the system selects components from both configurations. In this case, the system can produce a list, either on the monitor of the computer 100 or on the printer 108 (or both), of the respective combined configurations for several subscription classes above and below the subscription classes originally selected for the word processing class and the business class separately from which the user can select a desired configuration.

The education class of technology recognizes the need for students and teachers to have personal computer technology available economically without unnecessary components. Therefore, the present system provides a configuration template for the education class that begins with a 15" monitor 120, a standard keyboard 122, a mouse 124, a medium-speed processor 144, a modem 128, a medium speed printer 130, word processing software, research software, and communication software. The next higher subscription class adds a scanner 132 to the configuration and upgrades the printer 130 to a faster printer with increased output resolution.

The scientific class of technology, recognizing the need within the scientific community for higher computer processing and information storage needs, provides a component configuration that includes a high speed processor 144, large disk capacity including external storage unit 118, and faster communications equipment (as represented by the modem 128) with a conventional personal computer 116 configuration. The available bay 136 can optionally be utilized for a zip drive in a higher subscription class.

The mathematics class of technology provides a configuration template that is similar to the component configuration of the scientific class of technology but ensures that each subscription class includes the highest speed processor 144 available.

The research class of technology accommodates the needs of individual researchers to quickly analyze large volumes of data quickly and to output the results of the analysis quickly and clearly. Therefore, the standard configuration for the research class of technology includes a high speed processor 144, a large capacity hard drive 142, a high speed laser printer 130, and analysis software. Additionally, database software is provided for all scientific, mathematic, and research class of technology to facilitate the management of information.

The graphics class of technology is designed to accommodate the needs of both the student or educator who wants to create figures and graphics and the designer or engineer who wants to use the personal computer 116 to create his or her works, whether it is a self-portrait, a house, a bridge, or the cover of a new book. The configuration template for the graphics class of technology would therefore include a scanner 132, a camera 134, large volume storage 142 and/or 118, and graphics software. A higher subscription class would include a larger monitor 120, a better scanner, a high speed laser printer 130, and CAD software. By "better," the present description means a component that is faster, has more capacity, and/or has more features than a corresponding component against which a comparison is being made. The graphics class can also be directed to customers interested in having available a computer system 116 that can provide, for example, painting, two dimensional drawing, three dimensional drawing, and/or presentation resources.

The communications class of technology is directed at a user who wants rapid access to other users and media, all of which are remote to the user's computer 116 location. The configuration template for this class of technology would include a high speed modem 128, communication software. Recognizing that much of contemporary personal computer communication is directed toward Internet resources, the communications configuration template would include a graphics card 126, at least a 17" color monitor, a high speed modem 128 and/or an ethernet card 126, and browser software.

Each subscription fee class within each class of technology has a hardware/software configuration template that specifies the types of components with which each type of personal computer system will be configured. For example, the configuration template for a basic level subscription class for the education class of technology on a desktop personal computer can include a computer 116, a CD drive 138, a diskette drive 140, a hard drive 142, a monitor 120, a keyboard 122, a mouse 124, a printer 130, a modem 128, operating system software, word processing software, research software, and communication software. One goal of the inventive system is to completely configure a working personal computer 116 that will satisfy the needs of the user, given the user's primary areas of need and interest as well as the user's budget. For every user requesting a personal computer that satisfies his or her particular class(es) of technology as well as his or her subscription budget and system type, the inventive system can determine the best piece of equipment or best software package from the information stored on the storage device 102 for each template component within the total subscription budget.

Figure 2:
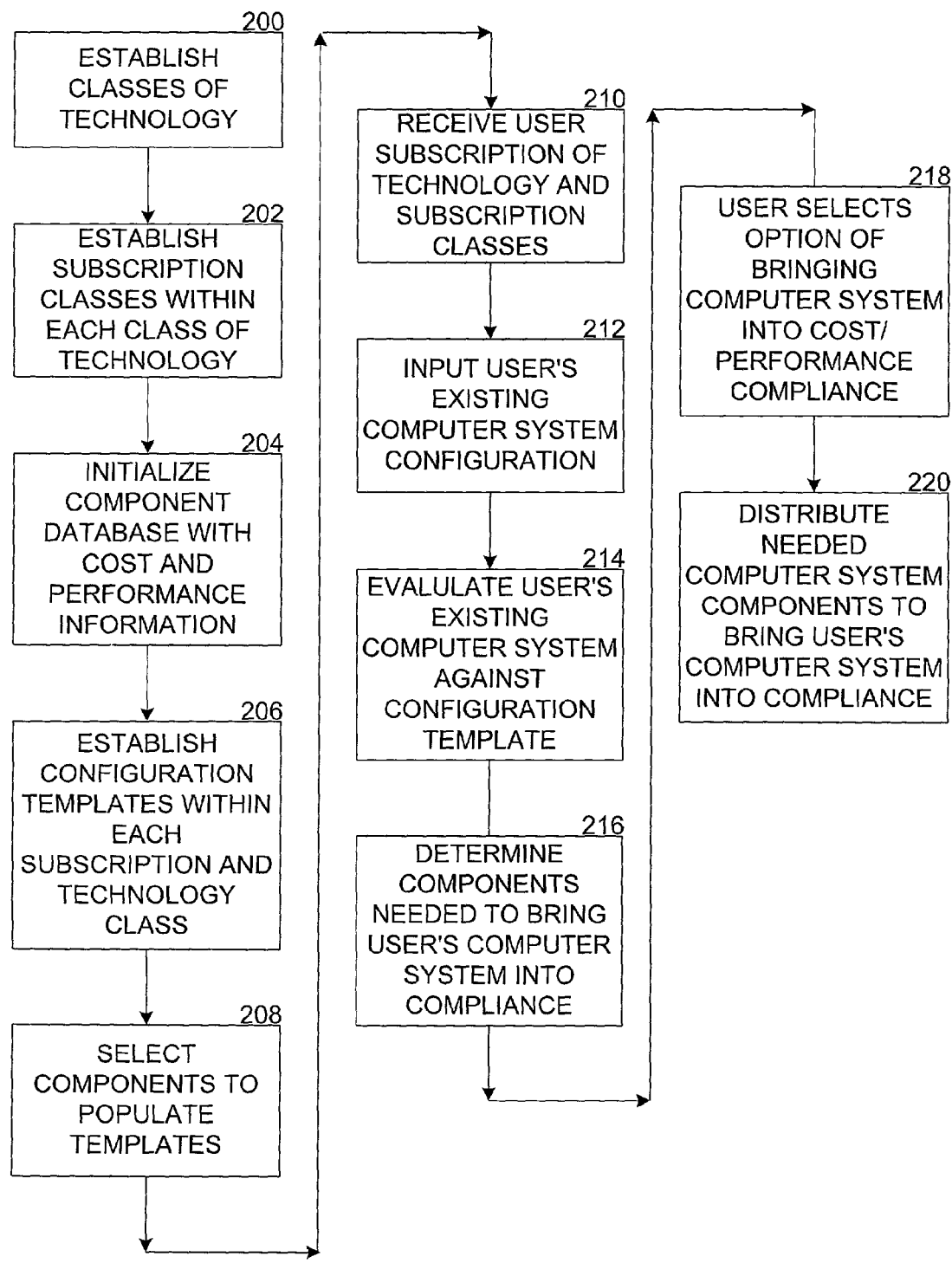
FIG. 2 shows a block flow chart of an exemplary method for maintaining a predetermined level of technology on a computer system.

Referring now to FIGS. 1 and 2, the processing of an exemplary embodiment of the inventive system will be discussed. A preliminary, manual step in effecting the processing of the present invention is the development or establishment, at step 200, of a plurality of classes or levels of technology for which the personal computer 116 is intended to provide technical solutions. While the inventive system will function equally well for a single class of technology as it will for a plurality of classes, the computer configurations produced by the system will be more broadly useful if the technology classes fulfilled by the system are sufficient in number to match the characteristics of most of the users who need to acquire, use, and maintain a computer system that efficiently and effectively satisfies their personal requirements. Each class of technology has established, at step 202, multiple subscription fee classes to accommodate the financial resources and priorities of the computer users. Before the inventive system can develop and maintain personal computer hardware and software configurations satisfying the needs and resources of various users, the computer component cost and specifications database on the storage device 102 must be loaded, or initialized, at step 204, with pricing and technical performance information related to the hardware and software components available to configure computer systems. At step 206, the configuration templates are built, specifying in general terms the hardware and software components recommended for each subscription class within each class of technology and system type. For example, one subscription class within the word processing class of technology can have a configuration template built to include a 750 MHz processor, a 15" monitor, a mouse, a 10 page/minute printer, operating system software, and word processing software. At step 208 the system automatically populates each configuration template with hardware and software components from the component database on the storage device 102, selecting components with the best cost/performance ratio that satisfy the elements of each configuration template.

For example, the component database may list two printers that print 10 or more pages per minute. The first printer costs $199.99 and the second printer costs $249.99. While the second printer may also print in color, this feature is not a requirement of this particular template and therefore would be an "unnecessary" cost feature. The printer with the better cost/performance ratio would be the first printer, and this printer would be selected to populate the configuration template. The populated templates then become standard computer system configurations for satisfying given classes of technology and subscription.

The data and information associated with the classes of technology, the subscription classes, and the configuration templates are all intended to be stored on a storage device 102, accessible by the computer 100. While only one storage device 102 is shown, the inventive system will function equally well should the files and databases utilized by the system be stored on a single device 102 or distributed across a plurality of storage devices, including devices accessible across the network 106 or located on the computer 100.

At step 210 the customer (also referred to herein as a "subscriber" or a "user") initiates the first step in the creation and ultimate maintenance of a hardware/software computer system configuration by signing up for, or subscribing to, a particular class of technology that best matches the user's interests and needs and for a subscription class within the class of technology that best serves the user's needs and budget. The system components through which the user effects the subscription can be viewed as an interface to the inventive system for receiving from the user a specific subscription, wherein the subscription represents the cost/performance level at which the user desires to have his or her computer system maintained, regardless of changes that may occur in the cost and specifications of computer system components. At a basic level of the invention's functions, the customer can select a particular class of technology, such as word processing; a cost class, such as basic; and a computer system type, such as a desktop personal computer. With this customer subscription information, the invention can be used to determine the matching computer hardware/software component configuration, with no other input, decision, or technical knowledge required from the customer.

If none of the classes of technology appear to match the customer needs or if the customer is not satisfied with the configuration list determined by the invention, he or she can select a combination of two or more classes of technology. As an aid in this selection step, the system can optionally display to the user a list of available classes of technology. The user can view this list on the computer 100 or can access the inventive system across the network 110 from his or her own computer 116. As with the information network 106, the network 110 can be any known network across any know medium and controlled by any known communications protocol package. By clicking on a displayed level of technology, a list of the subscription classes for that class of technology is displayed to the user, along with the configuration template for each subscription class.

For example, a user selecting the word processing class of technology would see as one subscription class configuration template a computer with a 750 MHz processor, a 15" monitor, a mouse, a 10 page/minute printer, operating system software, and word processing software, all for a monthly subscription fee of $50.00 per month. Since the system has already, in step 208, configured a standard package for each configuration template, the user would see a list of specific devices and software packages that satisfy the technology/subscription configuration. This component list could include a Hewlett Packard computer with a particular processor, a Hewlett Packard Office Jet® K60 printer, and a current version of a word processing program. The user selects, and the system receives, a subscription class, or fee cost level, such as the aforementioned $50.00 per month, within the class of technology. By selecting a particular class of technology and subscription class within that technology, the user has effectively selected a cost/performance level at which the computer system 116 is to be automatically maintained.

To maintain a user's computer system at a predetermined cost/performance level selected by the user, the user's computer system should begin at the desired cost/performance level. At step 212 the user enters his or her existing computer system configuration, component by component, if the user has a computer system. If the user has no existing computer system, the processing can skip to step 220. The processor on the computer 100 evaluates the user's components at step 214 by comparing them against the configuration template for the cost/performance level selected by the user. For each component of the user's existing computer system that does not comply with the configuration template by being below the requisite cost/performance level as selected by the user, the system displays to the user at step 216 the specific components from the standard configuration that would be required to be acquired by the user to reconfigure his or her computer system, thereby bringing the system into compliance with the selected cost/performance level.

The user is given the choice at step 218 of: (1) accepting the displayed components through the inventive system, (2) agreeing to acquire the requisite components on his or her own initiative, or (3) accepting the standard component configuration for the selected cost/performance level. Option (3) is the default option if the user does not have an existing computer system or if the user does not want to maintain his or her existing system at the selected technology level. If options (2) or (3) are chosen, the needed hardware and software components are automatically directed to the user at step 220 through a warehouse 112 and across the network 110 in the same manner as upgrades will be distributed to the user as discussed below. Under options (2) or (3), the inventive system determines the need to charge a one-time acquisition fee to bring the user's computer system up to the cost/performance level desired by the computer to be maintained by the inventive system, calculates the charge, and so displays to the user the additional cost.

The system stores the user's resultant computer system component configuration and the user's selected cost/performance level on the storage device 102 for later retrieval and maintenance processing. The stored user configuration constitutes a configuration template for the user, with each component of the template indicating a hardware or software component actually comprising the user's computer system. The user's template is time-stamped with the current date, with the date being representative of the level of technology in the component database that was applied to configure the user's computer system in accordance with the selected cost/performance level.

As an additional feature, the user can stipulate particular components desired to be included with the configured computer system. For example, the customer may want a 19" monitor 120 or a camera 134, whether or not the system would normally include such a component in its recommended configuration. Any such customization selection would result in a modification of the user's configuration template, and the user's subscription fee and acquisition fee would accordingly be adjusted to compensate for the changed equipment or software.

Figure 3:
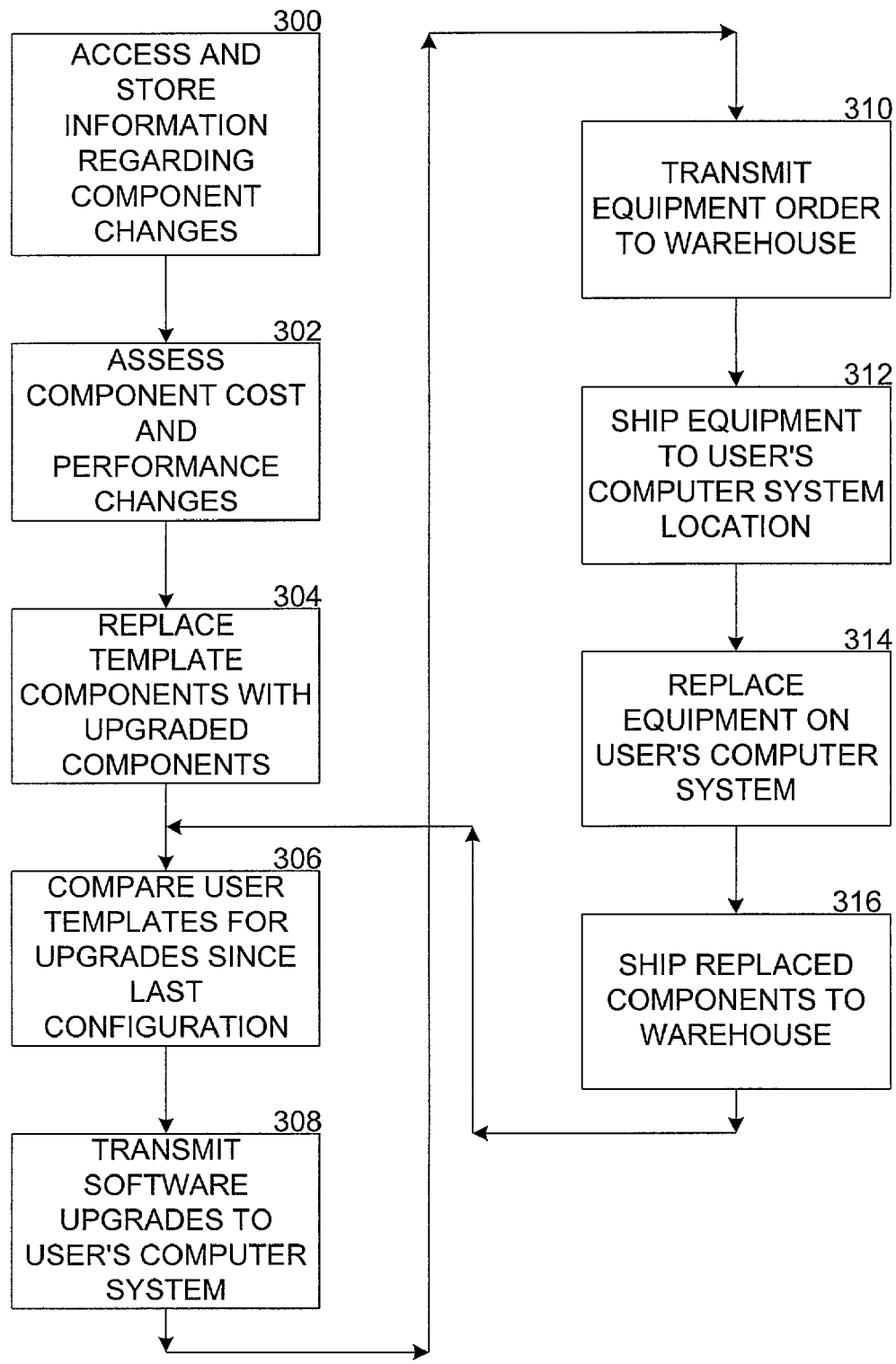
FIG. 3 shows a block flow chart of an exemplary method for maintaining a predetermined level of technology on a computer system.

Computer technology is rapidly evolving, both with the introduction of new hardware and software products and with the improvement of existing computer system components. Referring to FIG. 3, information regarding these additions and changes are accessed by the computer 100 at step 300 across the network 106 and through the input device 102 and are stored on the storage device 102. The processor of the computer 100 assesses these cost and performance changes at step 302 to determine those computer system components that have been upgraded with an improved release or version of the component or have been replaced by new, improved products. For each upgraded or replaced component in a standard configuration template or in a user template, as stored on the storage device 102, the processor replaces at step 304 the template component with the upgraded or replacement component that represents an improved cost/performance ratio.

As a preliminary check prior to replacing the component in the template, the processor reviews the technical specification information for the component against the technical specification information for the remaining components on the template to ensure that all components on the template are compatible with each other. For example, for a template monitor component of a 17" color monitor that costs $250.99, if a new 17" color monitor is introduced at a cost of $242.99, if the existing 17" color monitor is reduced in price by its manufacturer to $235.99, and if all the components remain compatible with each other, the system replaces all occurrences of this specific monitor in the standard and user templates with the new price of $235.99 while retaining the same 17" monitor model. Correspondingly, if several templates include a specific printer printing 10 color pages per minute costs $249.99 (cost/performance ratio of $24.999/page) and a new printer costing $189.99 (cost/performance ratio of $23.749/page) is announced printing 8 color pages per minute, the new printer will replace the former 10 pages/minute printer for those configurations that permit 8 color pages per minute. In this manner, the templates are upgraded to reflect improvements in the cost, performance, and capacity of the computer components while simultaneously maintaining the various cost/performance levels. Each of these upgrade changes to the standard and user templates is time-stamped in the template so the system can later determine the particular component upgrades that have been implemented since a particular standard or user configuration or reconfiguration.

Depending on the needs of the users of the inventive system, the above receipt, storage, and assessing of computer system component information is performed continuously, periodically, or upon occurrence of particular events, such as the introduction of a new computer system or operating system or the upgrading of a key computer system component. Similarly, the upgrading of each user's computer system with the upgraded template components can be done periodically, continuously, or upon occurrence of particular events. The preferred embodiment of the invention contemplates selecting upgrades corresponding to the components comprising each user's computer system configuration periodically, typically at six month intervals. However, the frequency of user computer system upgrades can be more or less frequent than every six months, depending on the needs of each user and the subscription each user is willing to pay. For example, a user who is conducting scientific research may want to continuously upgrade to the fastest processor available and the largest disk storage capacity and may be willing to pay the corresponding subscription fee for this level of cost/performance.

At step 306, at the interval selected by the user, the processor of the computer 100 compares the user's current configuration template with the upgraded user template that is the result of the receipt and processing of information in steps 300–304. Each component difference between the user's current template and upgraded template represents a hardware or software upgrade to be applied to the user's current configuration to maintain the user's computer system at the selected cost/performance level, as long as the timestamp for the component in the user's template reflects a date that is later than the prior configuration/reconfiguration of the user's computer system. As long as the system detects at least one upgrade to be implemented on the user's computer to reconfigure the user's computer, a reconfiguration time-stamp is set in the user's template record, indicating the current date of the latest reconfiguration.

At step 308, for each software upgrade detected in step 226, the particular software upgrade is transmitted by the computer 100 from the storage device 100 across the network 110 to the user's computer 116, where the software upgrade is staged for updating the software stored on the user's computer 116. Alternatively, the software upgrade can be transmitted from another source (not shown) across a network 110 to the user's computer 116 upon instruction initiated by the system computer 100. In either event, the software on the user's computer is automatically upgraded with the new and/or upgraded software components of which the inventive system has learned during the time period since the last upgrade of the user's computer system configuration.

At step 310, for each hardware upgrade determined in step 226 to be required to maintain the user's predetermined cost/performance level, a message is transmitted from the computer 100 to the warehouse 112. The warehouse assembles the hardware required to update the user's configuration and ships the equipment at step 312 via transportation means 114, such as an overnight courier, to the user's computer location for installation on the user's computer. Alternatively, the message transmitted to the warehouse 112 can include the software upgrades to be implemented on the user's computer system. In this latter embodiment of the invention, the software upgrades are either shipped to the user from the warehouse 112 with the equipment or are loaded onto the hardware prior to its shipment to the user. At step 314 the updated hardware components are installed on the user's computer system, replacing the outdated equipment components on the user's computer system. In another embodiment of the invention, the user's entire computer system is replaced at each upgrade interval. In this embodiment, the system recognizes that some users lack the ability or the interest in installing hardware and/or software upgrades on their computer systems and are willing to pay a commensurate subscription fee to have the entire computer system replaced, even if not all components are being upgraded.

As an additional option available to the user, the shipped equipment can be accompanied by shipping labels for the user to ship the replaced hardware components back to the warehouse 112 at step 316, thereby eliminating the problem of having no market for used and obsolete computer equipment. The operator of the present inventive system can refurbish or cannibalize the returned equipment to maximize use of the components and thereby keep the subscription fees as low as possible. If the customer has elected an option of having a technician install all equipment changes, the computer 100 also transmits at step 310 a message (not shown) to the technician, advising him or her that equipment is about to be shipped that requires installation at the customer's location.

In an alternative embodiment of the invention, the user has the option of selecting a fixed dollar amount, say one thousand dollars ($1,000.00), that is representative of the desired cost/performance level for a computer system. In this embodiment, the user would begin, for example, with a $1,000 computer system and would receive periodic upgrades to the hardware and software components as the cost/performance ratio of the components improved.

As an additional benefit to the customer and as an additional feature in an exemplary embodiment of the invention, the customer's current configuration can be made available to service personnel, either by hardcopy or across the network 106 and/or 110 in real time. In this manner, a service technician in, for example, a call center, can view the customer's hardware and software configuration and technical specifications to assist in debugging and solving a performance problem the customer is experiencing with his or her computer system.

Figure 4:
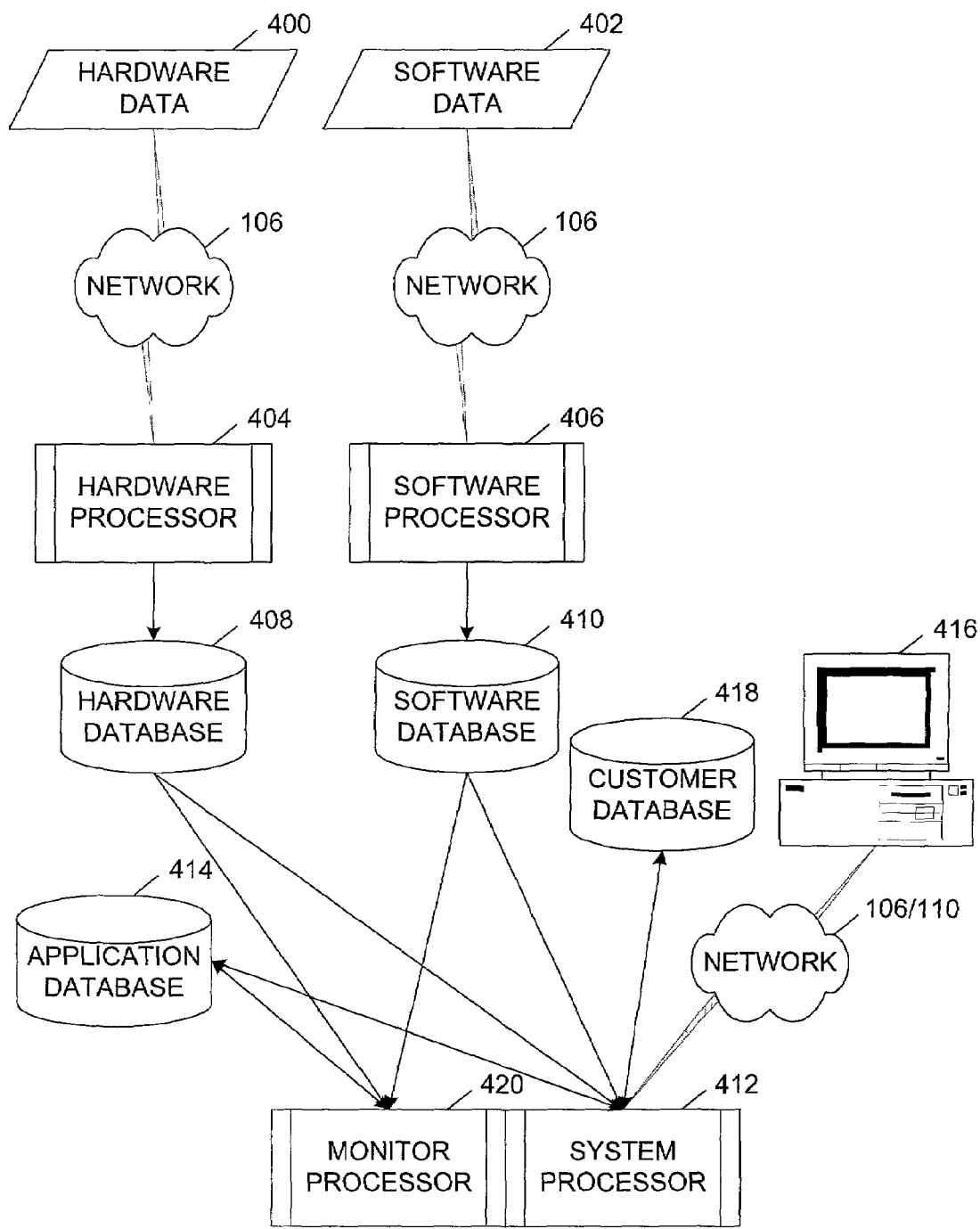
FIG. 4 shows a block diagram of the database and processor components of an exemplary system for establishing and maintaining a predetermined level of technology on a computer system.

Referring to FIGS. 1 and 4, there is shown the database and processing equipment and the data links of an exemplary system for determining and maintaining a customer's computer system at a predetermined level of technology. The storage device 102 can comprise a single device for storing the files and databases utilized by the invention. Alternatively, as shown in FIG. 4, these various files and databases can be distributed across a plurality of storage devices and databases. Data 400 and 402 represent technical and cost information related to the hardware and software components, respectively, that can be accessed on a continuous, periodic, or sporadic basis to keep component databases up to date and with which the system maintains a predetermined level of technology on customers' computer systems. This information is made available to the computer 100 across the network 106 or through an input unit 104, which can be of any known type, e.g., a keyboard. Data 400 and 402 are input to a processor 404 and a processor 406, respectively, to determine what technical specifications and costs have changed and what products have been added or discontinued for the components residing in the product database. The processors 404 and 406 can be separate from the processor on computer 100 or can be integrated in the computer 100 without detracting from the functionality of the invention. The product database on the storage device 102 can actually be two specialized databases, as shown in FIG. 4 as a hardware database 408 and a software database 410, each respectively storing hardware and software component technical and cost information. The updated information regarding the possible hardware and software components that are available to build computer system configurations can be stored on the hardware and software databases 408 and 410.

The hardware and software product information on databases 408 and 410, respectively, is input to the system processor 412 for the creation of system configuration templates as discussed with FIG. 2. The resultant templates are stored on the application database 414. The customer accesses the system through a graphical user interface attached to a computer 416 to subscribe to the service provided by selecting a technology class and a cost class for the customer's desired type of computer system. The graphical user interface through which the customer accesses the system can be attached to the computer 100 of FIG. 1, the customer's computer 116 that is to be maintained by the system, or a third computer accessible by the customer and connected across the network 106 to the computer 100/412. All customer information, including the technology and cost classes selected by the customer, the configuration template selected by the system to match the technology/cost level chosen by the customer, and the particular components selected by the system to populate the customer's computer system, are stored on the customer database 418. The databases 408, 410, 414, and 418 can reside on physically separate storage devices, can reside on a single storage device 102, or can reside in some combination of storage devices, all without detracting from the functionality of the invention.

Referring to both the system configuration maintenance steps shown in FIG. 3 and the components shown in FIG. 4, at step 302 the monitor processor 420 accesses the application database 414 to determine if updated or new product information regarding technical and cost specifications warrant modifying any of the configuration templates with new or updated components. If so, the configuration template information is updated at step 304 on the application database 414, and the customer templates on the customer database 418 are queried at step 306 to determine if any customer systems should be updated to maintain the customer systems within their respective predetermined levels of technology and cost. If changes are warranted, and if the respective customer systems are due for maintenance, the maintenance processing of steps 308 to 316 is initiated to maintain each customer's computer system at a predetermined cost/performance level.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An apparatus for updating at least one of the hardware and software of a computer system to maintain the computer system at a predetermined one of plural cost/performance levels, comprising:
an interface for receiving a subscription to maintain a user's existing computer system within a predetermined one of plural cost/performance levels; and
a processor for assessing changes to the performance and cost of hardware and software suitable for a given cost/performance level at which the computer system is to be maintained, wherein during the subscription the processor automatically selects upgrades to reconfigure the computer system when the changes satisfy a cost/performance ratio associated with the given cost/performance level based on a technology level selected from a technology level list including word processing, spreadsheet, programming, business, education, scientific, mathematics, research, graphics, music, animation, and communications.

2. The system according to claim 1, wherein the computer system is maintained by implementing the automatically selected upgrades on the computer system upon advance receipt of the subscription by the interface.

3. The system according to claim 1, wherein the interface receives subscriptions for a plurality of predetermined levels of performance.

4. A computer implemented method for updating at least one of the hardware and software of a computer system to maintain the computer system at a predetermined one of plural cost/performance levels, comprising:
receiving a subscription to maintain a user's existing computer system within a predetermined one of plural cost/performance levels;
assessing changes to the performance and cost of hardware and software suitable for a given cost/performance level at which the computer system is to be maintained; and
automatically selecting upgrades during the subscription to reconfigure the computer system when the changes satisfy a cost/performance ratio associated with the given cost/performance level based on a technology level selected from a technology level list including word processing, spreadsheet, programming, business, education, scientific, mathematics, research, graphics, music, animation, and communications.

5. The method according to claim 4, further including reconfiguring the computer system by implementing the automatically selected upgrades on the computer system upon advance receipt of the subscription.

6. The method according to claim 5, wherein the step of implementing the automatically selected upgrades is fulfilled by transmitting software upgrades to the computer system across a network.

7. The method according to claim 5, wherein the step of implementing the automatically selected upgrades is fulfilled by shipping hardware upgrades to the computer system location.

8. The method according to claim 5, wherein the step of implementing the automatically selected upgrades is fulfilled by replacing the computer system with a reconfigured computer system, wherein the reconfigured computer system includes the automatically selected upgrades.

9. The method according to claim 5, wherein the step of reconfiguring the computer system with the automatically selected upgrades maintains the predetermined cost/performance level on the computer system.

10. The method according to claim 4, wherein the reconfigured computer system is comprised of components that are compatible with each other.

11. The method according to claim 4, wherein the predetermined cost/performance level is determined from one of a plurality of classes of cost and from one of a plurality of classes of technology.

12. The method according to claim 11, wherein the upgrades are automatically selected to maintain the subscribed class of cost and the subscribed class of technology.

13. The method according to claim 4, wherein the step of assessing changes to the performance includes determining changes in operating speed of hardware and software.

14. The method according to claim 4, wherein the step of assessing changes to the performance includes determining changes in the capacity of hardware.

15. The method according to claim 4, wherein the steps of assessing changes and automatically selecting upgrades is automatically initiated at predetermined intervals.

16. The method according to claim 4, wherein the steps of assessing changes and automatically selecting upgrades is automatically initiated when new information regarding the cost or performance of hardware or software is received.

17. The method according to claim 4, wherein the step of automatically selecting upgrades comprises selecting hardware and software whose cost/performance ratio has improved based on the receipt of the new information.

18. The method according to claim 4, wherein the steps of assessing changes and automatically selecting upgrades is automatically initiated when information regarding a hardware or software product replacement is received.

19. A computer implemented method for updating at least one of the hardware and software of a computer system to maintain the computer system at a predetermined one of plural cost/performance levels, comprising:

receiving a subscription to maintain a user's existing computer system within a predetermined one of plural cost/performance levels;

assessing changes to the performance and cost of hardware and software suitable for a given cost/performance level at which the computer system is to be maintained;

automatically selecting upgrades during the subscription to reconfigure the computer system when the changes satisfy a cost/performance ratio associated with the given cost/performance level; and defining a plurality of classes of users of the configured computer system, wherein at least one class of user corresponds to each of the plurality of classes of technology, and wherein the predetermined cost/performance level is determined from one of a plurality of classes of cost and from one of a plurality of classes of technology.

20. The method according to claim 19, wherein the defined classes of users are selected from a user level list including word processing user, spreadsheet user, programming user, business user, basic user, advanced user, professional user, student user, multimedia user, scientist user, research user, graphics user, and communications user.

* * * * *